US011036356B2

(12) United States Patent
Garber et al.

(10) Patent No.: US 11,036,356 B2
(45) Date of Patent: Jun. 15, 2021

(54) SERVICE BACKED DIGITAL RULED PAPER TEMPLATES

(71) Applicant: Microsoft Technology Licensing, LLC, Redmond, WA (US)

(72) Inventors: David Garber, Bellevue, WA (US); Andrew Casey, Redmond, WA (US); Christopher Clarke, Issaquah, WA (US); Fanguang Kong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/665,059

(22) Filed: Jul. 31, 2017

(65) Prior Publication Data

US 2019/0034044 A1  Jan. 31, 2019

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 40/103* (2020.01); *G06F 40/109* (2020.01);
(Continued)

(58) Field of Classification Search
CPC ...... G06F 3/0482; G06F 17/214; G06F 17/24; G06F 17/211; G06F 17/248; G06F 16/27
(Continued)

(56) References Cited

U.S. PATENT DOCUMENTS 6,072,461 A * 6/2000 Haran ................. G06F 3/04895
345/157
7,552,222 B2    6/2009 Garimella et al.
(Continued)

FOREIGN PATENT DOCUMENTS

WO    1992021097 A1    11/1992
WO    2017032459 A1    3/2017

OTHER PUBLICATIONS

"Learning from data: A tutorial with emphasis on modern pattern recognition methods", Matteo Pardo and Giorgio Sberveglieri, IEEE sensors Journal, vol. 2, No. 3, Jun. 2002, p. 203-217.*
(Continued)

*Primary Examiner* — Renee D Chavez
*Assistant Examiner* — Jianmei F Duckworth

(57) ABSTRACT

Non-limiting examples of the present disclosure relate to service-backed generation and management of digital ruled paper templates in an exemplary application/service such as a notetaking service. As an example, access to a user account of a notetaking service is detected. A digital context associated with the user account is evaluated. An evaluation of the digital context comprises identifying user identity data associated with the user account and analyzing domain specific data of the notetaking service that corresponds with the identified user identity data. The domain specific data may comprise data identifying a specific electronic notebook of the notetaking service. A customized listing of digital ruled paper templates is populated based on an evaluation of the digital context. The customized listing of digital ruled paper templates is transmitted to the client computing device, which surfaces the customized listing of digital ruled paper templates in a user interface of the notetaking service.

20 Claims, 6 Drawing Sheets

(51) Int. Cl.
*G06F 40/103* (2020.01)
*G06F 40/109* (2020.01)
*G06F 40/166* (2020.01)
*G06F 40/186* (2020.01)
*G06F 16/27* (2019.01)

(52) U.S. Cl.
CPC .......... *G06F 40/166* (2020.01); *G06F 40/186* (2020.01); *G06F 16/27* (2019.01)

(58) Field of Classification Search
USPC .......................................................... 715/745
See application file for complete search history.

(56) References Cited

U.S. PATENT DOCUMENTS

| | | | |
|---|---|---|---|
| 7,764,830 B1 | 7/2010 | Wnek | |
| 8,645,383 B2 | 2/2014 | Brown et al. | |
| 8,793,570 B2 | 7/2014 | Hanechak | |
| 9,928,230 B1* | 3/2018 | Jain | G06F 40/103 |
| 10,108,307 B1* | 10/2018 | Hu | G06F 9/451 |
| 2007/0208800 A1* | 9/2007 | Frohlich | G06F 21/602 |
| | | | 709/203 |
| 2009/0070098 A1* | 3/2009 | Patryshev | G06F 3/0238 |
| | | | 704/3 |
| 2011/0002547 A1* | 1/2011 | Enomoto | G06K 9/00449 |
| | | | 382/195 |
| 2011/0016431 A1 | 1/2011 | Grosz et al. | |
| 2013/0183651 A1* | 7/2013 | Takahashi | G09B 5/06 |
| | | | 434/350 |
| 2015/0154361 A1* | 6/2015 | Barsoum | G16H 80/00 |
| | | | 705/3 |
| 2016/0267087 A1* | 9/2016 | Mowatt | G06F 16/24578 |
| 2019/0012046 A1* | 1/2019 | Marzouk | G06F 3/0482 |

OTHER PUBLICATIONS

Wey, Claudia, "Scrble", https://www.microsoft.com/en-us/store/p/scrble/9wzdncrdf9xq, Retrieved On: Jun. 9, 2017, 9 pages.
"Notes HD Free—Take notes, Annotate PDF, Draw", https://itunes.apple.com/us/app/notes-hd-free-take-notes-annotate-pdf-draw/id549775040?mt=8, Retrieved on: Jun. 9, 2017, 2 pages.
Caldwell, Serenity, "The best apps for handwriting with the Apple Pencil and iPad Pro", https://www.imore.com/best-apps-handwriting-apple-pencil-and-ipad-pro, Published on: Apr. 15, 2016, 43 pages.
"Lined Paper Template", https://web.archive.org/web/20161121034436/http://www.wordstemplates.org:80/lined-paper-template/, Published on: Nov. 26, 2016, 1 page.
"Font Family (HTML)", Retrieved From: https://en.wikipedia.org/w/index.php?title=Font_family_(HTML)&oldid=763810434, Feb. 5, 2017, 5 Pages.
"The Fluidic Player", Retrieved From: http://web.archive.org/web/20170729112758/http://www.adobe.com/products/captivateprime/features.html, Jul. 29, 2017, 12 Pages.
"International Search Report and Written Opinion Issued in PCT Application No. PCT/US2018/034973", dated Aug. 30, 2018, 13 Pages.

\* cited by examiner

SERVICE BACKED DIGITAL RULED PAPER TEMPLATES

BACKGROUND

Digital ruled paper is electronic lined notepaper having a configurable page style. Digital ruled paper is useful for any of a variety of purposes including use in education (e.g. replicating notebook pages for writing, homework assignments, etc.). Exemplary notes applications may provide various electronic paper templates for generating digital ruled paper. However, page styles for electronic paper templates are typically fixed and not rendered for specific purposes, which may make generalized templates nonoptimal for working with characters, glyphs, etc. of specific languages.

Further, update to a library of electronic paper templates typically requires update to a local copy of an application, for example, data that is locally stored on a client computing device. This requires user intervention in order for updates to electronic paper templates to be applied. In cases where users do not update the application, contextually relevant templates may not be readily available for the user.

Additionally, a listing of electronic paper templates, that may be presented to a user through a user interface of a notes application, is also fixed and may not be customized to provide electronic paper templates that are most contextually relevant to a specific user. Current notes applications do not provide a way to enable/disable display of specific templates, which results in the most general electronic paper templates being displayed for a user. This makes it more difficult for users to find and utilize more complex and limited use case templates.

SUMMARY

Non-limiting examples of the present disclosure relate to service-backed generation and management of digital ruled paper templates that are provided through an application/service. Digital ruled paper templates may be dynamically generated and presented to a user, where the digital ruled paper templates are customized to be contextually relevant based on a digital context of a user account associated with an exemplary application/service. In one non-limiting example, access to a user account of a notetaking service is detected, for example, where a user account may be accessing the notetaking service from a client computing device (e.g. via a network connection). A digital context associated with the user account of the notetaking service may be evaluated, for example, by one or more server-side computing devices. An evaluation of the digital context may comprise identifying user identity data associated with the user account and analyzing domain specific data of the notetaking service that corresponds with the identified user identity data. As an example, the domain specific data may comprise data identifying a specific electronic notebook of the notetaking service. A customized listing of digital ruled paper templates may be populated based on an evaluation of the digital context associated with the user account. The customized listing of digital ruled paper templates may be transmitted to the client computing device, which surfaces the customized listing of digital ruled paper templates in a user interface of the notetaking service. Other non-limiting examples are subsequently provided in the detailed description of the present disclosure including dynamic generation and management of customized digital ruled paper templates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
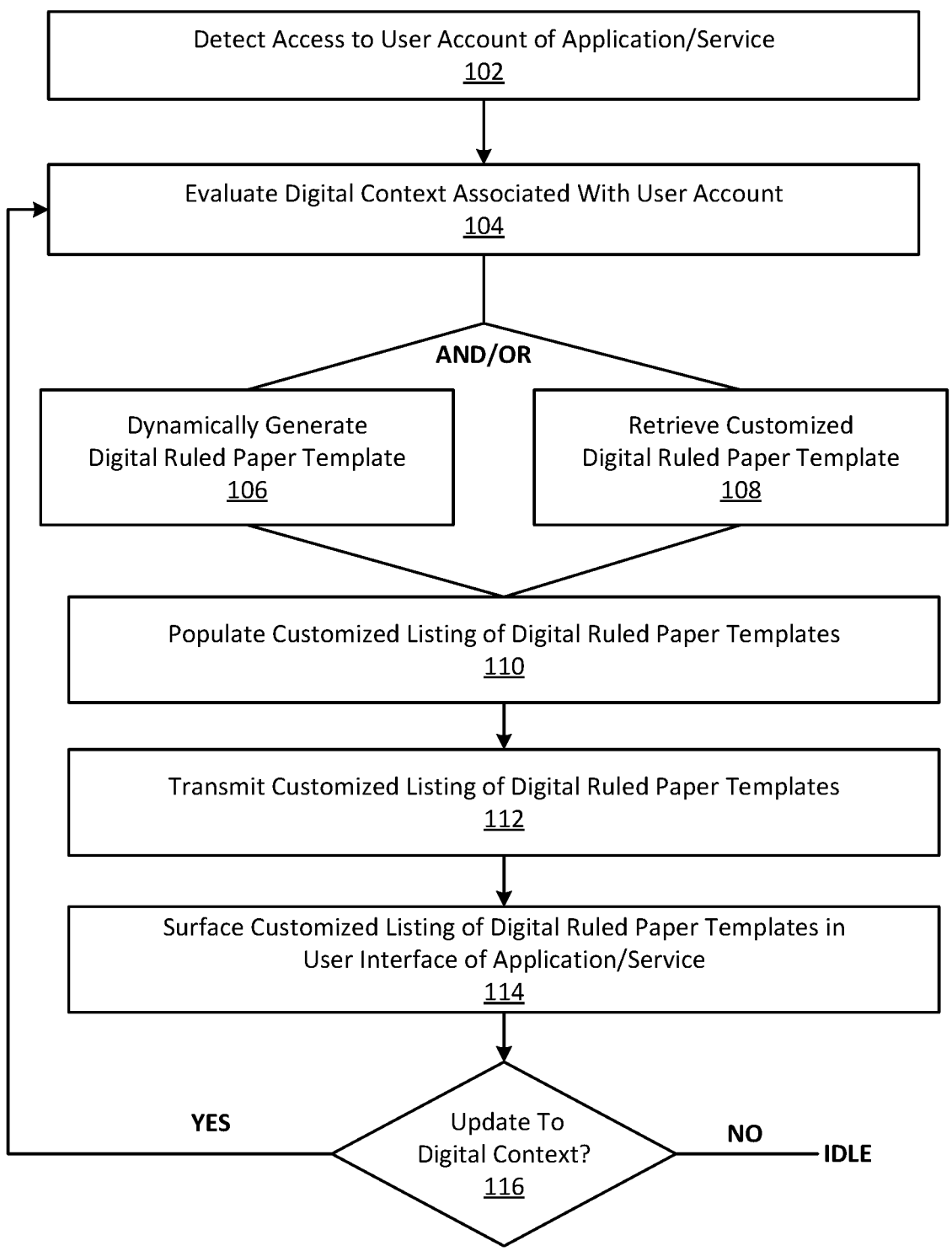
FIG. 1 illustrates an exemplary method related to dynamic generation and notification management of exemplary digital ruled paper templates with which aspects of the present disclosure may be practiced.

Non-limiting examples of the present disclosure relate to service-backed generation and management of digital ruled paper templates that are provided through an application/service. Digital ruled paper templates may be dynamically generated and presented to a user, where the digital ruled paper templates are customized to be contextually relevant based on a digital context of a user account associated with an exemplary application/service. In one example, an exemplary application/service is a notetaking service that provides digital ruled paper templates for users to work with within an electronic notebook of the notetaking service. For instance, an exemplary user account may be an educational account where the user account is affiliated with a specific electronic notebook for a course in which the user is enrolled. Digital ruled paper templates that are contextually relevant for the course may be surfaced to the user account, for example, instead of general digital ruled paper templates that may not be useful for the course. While a notetaking service is an example of an exemplary application/service, examples described herein are not so limited and may extend to any type of application/service that utilizes digital ruled paper templates. Digital ruled paper templates and exemplary digital ruled paper (generated based on the digital ruled paper templates) may be customizable where lines of displayed digital ruled paper may be presented in any arrangement including horizontally (across a page), vertically and in grid form, among other examples.

In one non-limiting example, access to a user account of a notetaking service is detected, for example, where a user account may be accessing the notetaking service from a client computing device (e.g. via a network connection). A digital context associated with the user account of the notetaking service may be evaluated, for example, by one or more server-side computing devices. An evaluation of the digital context may comprise identifying user identity data associated with the user account and analyzing domain specific data of the notetaking service that corresponds with the identified user identity data. As an example, the domain specific data may comprise data identifying a specific electronic notebook of the notetaking service. A customized listing of digital ruled paper templates may be populated based on an evaluation of the digital context associated with the user account. The customized listing of digital ruled paper templates may be transmitted to the client computing device, which surfaces the customized listing of digital ruled paper templates in a user interface of the notetaking service.

In further examples, an exemplary digital ruled paper template for an application/service may be dynamically generated based on an evaluation of the digital context associated with a user account of the application/service. In one instance, the dynamically generated digital ruled paper template is dynamically generated for a specific electronic notebook of a notetaking service that may enable a user account to be configured to work with multiple electronic notebooks. For example, the notetaking service may be educational-based, where a specific electronic notebook is configured for a course that a user account is enrolled in. An exemplary digital ruled paper template can be dynamically generated for the course by the notetaking service or by a user of the notetaking service, for example, an administrator/teacher of the course.

As an example, dynamically generating of an exemplary digital ruled paper template may comprise setting a page style for the digital ruled paper template including defining metadata for a line grouping of the digital ruled paper template. Among other types of data, the metadata for the line grouping may comprise line data defining a line of the line grouping, an angle for arrangement of lines in the line grouping and a measurement unit defining replication of the line in the line grouping. A line grouping may contain more than one line with the same angle (e.g. 2 lines which share an angle but with differing offsets from the origin and different colors etc.)

The metadata for the line grouping may further comprise metadata defining: one or more glyphs that correspond with page style of the digital ruled paper template. As an example, an associated glyph may be prioritized for placement in a line of the digital ruled paper template when the digital ruled paper template is launched in the user interface of the notetaking service. An exemplary glyph may cover a line or multiple lines (e.g. 3 lines for a music notation). Line data (e.g. of a line grouping) may further comprise metadata defining: a distance from a page origin of a first occurrence of the line grouping, a color associated with the line as well as other forms of metadata (e.g. unique identification for template, identifiers of user accounts associated with template, spacing for the line, dimensions, angles for the lines and/or content, etc.).

As identified above, further examples may extend to processing operations that enable a user of an application/service to dynamically generate a customized digital ruled paper template, for example, for a specific electronic notebook of a notetaking service. For instance, a customized digital ruled template may be created by an administrator associated with the specific electronic notebook for distribution to tenant accounts of the notetaking service that are associated with the specific electronic notebook. In examples where a customized digital ruled paper template is generated for a specific electronic notebook, an exemplary notetaking service may be configured to retrieve a customized digital ruled template for the specific electronic notebook and push the customized digital ruled paper template to other user accounts of the specific electronic notebook. The customized digital ruled paper template may be used for population of a customized listing of digital ruled paper templates that can be surfaced to users of the notetaking service.

Additional examples described herein may extend to application/service usage related to selection of specific digital ruled paper templates. For instance, generation and management of exemplary digital ruled paper templates may be managed on a server side of a service, for example, to improve processing efficiency and user interaction with an exemplary notetaking service. In one instance, a user may be provided a customized digital ruled paper template that is new to the user. When the user accesses the customized digital ruled paper template, the notetaking service may be configured to enable the user to smart copy/paste specific content from the template and even when the user doesn't have the template saved locally on their computing device. Other application/service usage examples are also described.

Accordingly, the present disclosure provides a plurality of technical advantages including but not limited to: generation and management of customized digital ruled paper templates that include complex paper styles, ability to customize listings of digital ruled paper templates that are contextually relevant to users, improved processing efficiency (e.g., saving computing cycles/computing resources) for client computing devices when executing exemplary applications/services, for example, where digital ruled paper template data is managed through server-side processing and not required to be managed locally on a client computing device, improving user interaction with productivity applications and platform computing resources that utilize digital ruled paper templates including an ability to render and update digital ruled paper templates in real-time on behalf of users, and extensibility to integrate processing operations described herein in a variety of different applications/services, among other examples.

FIG. 1 illustrates an exemplary method 100 related to dynamic generation and notification management of exemplary digital ruled paper templates with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where access to a user account an exemplary application/service is detected. For instance, a user may be accessing a software service (e.g. service provided by Office365® or associated bundle of services) from a client computing device (e.g. via a network connection/Internet). In one example, an exemplary application/service is a notetaking service (e.g. Microsoft® OneNote®, as well as educational-driven notetaking applications/service, etc.) that provides digital ruled paper templates for users to work with within an electronic notebook of the notetaking service. Examples described herein are not limited to an exemplary notetaking service and may further extend to any type of application/service that utilizes digital ruled paper templates. Other productivity applications/services may be configured to utilize exemplary digital ruled paper templates, where such productivity applications may include but are not limited to: web search services, e-mail applications, calendaring applications, word processing applications, spreadsheet applications, notes applications, visual presentation applications and database management applications, among other examples.

Subsequent examples may reference an exemplary notetaking service for ease of understanding, for example, where a user account is accessing the notetaking service (via a network connection) using a client computing device. In one instance, an exemplary user account may be an educational account where the user account is affiliated with a specific electronic notebook (of the notetaking service) that is associated with a class/course in which the user is a part of. However, user accounts described herein are not limited to just educational examples.

As identified above, an exemplary notetaking service may be configured to enable users to work with digital ruled paper templates. A digital ruled paper template is documentation that is used to generate digital ruled paper. An exemplary digital ruled paper template provides a configurable page style that is used to render an electronic document representing lined notepaper. Digital ruled paper templates and exemplary digital ruled paper (generated based on the digital ruled paper templates) may be customizable where lines of displayed digital ruled paper may be presented in any arrangement including horizontally (across a page), vertically and in grid form, among other examples. Examples of data that is configurable to differentiate page styles of different digital ruled paper templates is provided in the subsequent description. An electronic notebook may be a specific tenant configured within the notetaking service where multiple users may be affiliated with a specific electronic notebook. For example, a teacher/administrator may utilize an electronic notebook (e.g. tenant) as a personal workspace for students, a content library for handouts, and a collaboration space for lessons and creative activities, among other examples. Exemplary digital ruled paper templates may be applicable to assist users with rendering content (e.g. through handwritten input, device input, speed input, etc.), for example, that may be pertinent to content associated with a specific electronic notebook. As an example, French Rule Lined Paper (Séyès) is used by students learning French or being taught in a French educational system to help them practice and refine their penmanship. This custom ruled line system is specifically tailored for learning written French in an educational environment as it is designed to help students form French characters with the correct spacing and proportions using visual cues to ensure accurate pen movement. Other countries also have their own paper styles (e.g. Genko Yoshi which is used in Japanese writing and a grid with diagonals used in Chinese calligraphy, etc.) where an exemplary notetaking service can be adapted to include customized digital ruled paper templates that are contextually relevant to users in specific instances. Furthermore, an exemplary notetaking service intelligently adapts to understand contexts that specific users are working in. An exemplary notetaking service is configured to make customized digital ruled paper templates available to a subset of users rather than all users when such templates may not be as contextually relevant in all scenarios.

In processing operation 102, an exemplary notetaking service may be configured to execute server-side processing to detect access to a notetaking service. For instance, access may be detected in instances comprising but not limited to: when a user account first logs into the notetaking service, when a user selects a user interface (UI) menu option to view digital ruled paper templates, when a user switches electronic notebooks in the notetaking service and in instances where a predetermined amount of time has passed (e.g. where the user is logged into the notetaking service).

Flow may proceed to processing operation 104, where a digital context associated with the user account of the notetaking service may be evaluated. As an example, one or more server-side computing devices associated with the notetaking service may be configured to evaluate the digital context associated with the user account based on a detection (processing operation 102) of access to the notetaking service. An evaluation of the digital context may comprise identifying user identity data associated with the user account and analyzing domain specific data of the notetaking service that corresponds with the identified user identity data.

An exemplary notetaking service may be configured to communicate with an identity service to obtain user identity data associated with a specific user account. In one example, the identity service is associated with a platform suite of services (e.g. Microsoft® Office365®) where a user account may be used to login to the platform suite of services. In another example, the user account data may specifically correspond to a particular application/service (e.g. notetaking service). User identity data may comprise any information that is pertinent to identifying a user including but not limited to: user name, user login data (e.g. user ID), user profile data, client computing devices associated with the user account (including a device that is being used to access an exemplary application/service), applications installed on specific client computing devices associated with the user account, associated documents and associated application/services of the user, etc. Exemplary user identity data may be utilized by an application/service to correspond domain specific data for application/services such as the notetaking service where an analysis of the domain specific data is used to render contextually relevant digital ruled paper template and/or surface a customized listing of digital ruled paper templates.

As referenced above, processing operation 104 may further comprise evaluating domain specific data of an exemplary application/service (e.g. notetaking service). Domain specific data may comprise data pertaining to application usage of a specific application/service. For example, the domain specific data may identify specific tenants associated with the user account. In an example where the application/service is a notetaking service, the domain specific data may comprise data identifying a specific electronic notebook (or electronic notebooks) of the notetaking service. As referenced above, an electronic notebook may be associated with specific content, for example, such as educational content for a course/class. Such data may be useful in identifying specific templates (e.g. that may be more obscure and less used as compared with other general templates), customized digital ruled paper templates that have been created (e.g. by an administrator) or providing data for customization and dynamic rendering of an exemplary digital ruled paper templates, among other examples. In further examples, domain specific data may comprise data from any application usage including but not limited to: use of digital ruled paper templates (including frequently used templates, style, preferences, etc.), tenants/groups, associations, explicit and/or implicit usage by users with respect to specific content, linked users and social networking data, domain specific data of other applications/services associated with the user account, correspondence provided by users (e.g. content/digital templates pushed to other users), computing device data associated with access to specific applications/services, other user accounts that may be associated with the user account, etc.

In one example, evaluation (processing operation 104) of a digital context associated with a user account may comprise server-side analysis that may apply one or more learning models to process domain specific data and/or user identity data. In other examples, specific processing operations may be programmed (e.g. through an application programming interface (API) to collect, aggregate and analyze domain specific data. In some instances, other applications/services (including third-party applications/services) may interface with an exemplary notetaking service, for example, to provide telemetric analysis of specific data, entity data or semantic information, which may be used to assist with rendering of customized digital rule paper templates or customization when surfacing digital rule paper templates through a user interface of the notetaking service.

An analysis of a digital context of the user account may advance method 100 to processing operations 106 and/or 108, which may be used to render and retrieve content for population of a customized listing of digital ruled paper templates that are contextually relevant to the digital context of the user account. In some examples of method 100, flow may proceed to processing operation 106, where an exemplary digital ruled paper template for an application/service may be dynamically generated based on an evaluation of the digital context associated with a user account of the application/service. In one instance, the dynamically generated digital ruled paper template is dynamically generated (processing operation 106) for a specific electronic notebook of a notetaking service that may enable a user account to be configured to work with multiple electronic notebooks. For example, the notetaking service may be educational-based, where a specific electronic notebook is configured for a course that a user account is enrolled in. An exemplary digital ruled paper template can be dynamically generated for the course by the notetaking service or by a user of the notetaking service, for example, an administrator/teacher of the course.

To enable customization options inside the notetaking service, the notetaking service is configured (or adapted) to provide an innovative and flexible rendering system is implemented that not only expects the data underlying a page style for a digital ruled paper template to expand over time (thus providing users on an older client with a partial experience based on the components that that version is able to render), but is able to draw any type of rule line that can be specified in the above formats. Should a user specify they want a page consisting entirely of lime green lines rendered at 30 degrees (e.g. clockwise from vertical) occurring every 4 inches on a digital canvas, the notetaking service is configured to enable that for them without changing anything in the client itself, instead making all these changes via an administrator portal on the server side and then subsequently surfacing a customized digital template to enabled users (e.g. of the specific electronic notebook) after the user identity data is validated (e.g. by an identity service). At that point, a client computing device may just receive pertinent data transmitted from the server-side processing render a customized listing and customized templates as appropriate. An exemplary notetaking service may further be configured to enable metadata associated with a digital ruled paper template to be customized and updateable in real-time. This may also mean that if new metadata field (such as Glyphs support for dashed lines, arrangement of lines, type of lines (e.g. grid, horizontal, vertical, etc.)) is added to a page style of a digital ruled paper template, any users with an older client version are able to render the portions of the style supported by their client while leaving the remaining new data alone for those collaborating on a newer client. Because rendering and management of exemplary digital ruled paper templates is service backed, developers can intelligently deliver a list of supported styles to the product so that the gallery of available styles is limited to those both made available to the user based on identity as well as limiting to the capabilities of the client they are currently using.

As an example, dynamically generating of an exemplary digital ruled paper template may comprise setting a page style for the digital ruled paper template including defining metadata for a line grouping of the digital ruled paper template. A line grouping can contain more than one line with the same angle (e.g. 2 lines which share an angle but with differing offsets from the origin and different colors etc.) Among other types of data, the metadata for the line grouping may comprise line data defining a line of the line grouping, an angle for arrangement of lines in the line grouping and a measurement unit defining replication of the line in the line grouping. The metadata for the line grouping may further comprise metadata defining: one or more glyphs that correspond with page style of the digital ruled paper template. As an example, an associated glyph may be prioritized for placement in a line of the digital ruled paper template when the digital ruled paper template is launched in the user interface of the notetaking service. An exemplary glyph may cover a line or multiple lines (e.g. 3 lines for a music notation). A line grouping may contain more than one line with the same angle (e.g. 2 lines which share an angle but with differing offsets from the origin and different colors etc.) Line data (e.g. of a line grouping) may further comprise metadata defining: a distance from a page origin of a first occurrence of the line grouping, a color associated with the line as well as other forms of metadata (e.g. unique identification for template, spacing for the line, dimensions, etc.). Additional metadata fields may also be definable including but not limited to: dimensions for display of a product of the digital ruled paper template (e.g. based on a client computing device that is being used to render the digital ruled paper template), dimensions of lines (e.g. height, width), placement of notes/comments and types of glyphs, characters, symbols, etc. accepted with the digital ruled paper template and user and/or tenant identification data that is associated with a digital ruled paper template, among other examples. Furthermore, another example of metadata that may be added is data tailored for the handling of coincident lines, for instance, where spacing in terms of a base measurement is defined so that computation may be performed with integers that are specified for customized digital ruled paper templates).

As identified above, further examples of method 100 may extend to processing operations that enable a user of an application/service to dynamically generate a customized digital ruled paper template, for example, for a specific electronic notebook of a notetaking service. The notetaking service may be configured to execute processing operations to retrieve (processing operation 108) customized digital ruled paper templates that are created by other users. For instance, a customized digital ruled template may be created by an administrator associated with the specific electronic notebook for distribution to tenant accounts of the notetaking service that are associated with the specific electronic notebook. In examples where a customized digital ruled paper template is generated for a specific electronic notebook, an exemplary notetaking service may be configured to retrieve (processing operation 108) a customized digital ruled template for the specific electronic notebook. In one example, a customized digital ruled paper template that is retrieved (processing operation 108) may be utilized to populate a customized listing of digital ruled paper templates for the user account. In further instances, customized digital ruled paper templates that have been previously created by other users may be retrieved and pushed to other user accounts of a tenant (e.g. the specific electronic notebook).

Whether customized digital ruled paper templates are dynamically generated (processing operation 106) or retrieved (processing operation 108), flow may proceed to processing operation 110, where the notetaking service is configured to populate a customized listing of digital ruled paper templates that are contextually relevant to the user account. For example, processing operation 110 may comprise executing processing operations that select one or more digital ruled paper templates for presentation to a user based on an evaluation of the digital context associated with the user account. As an example, it may be determined that the user account is associated with multiple electronic notebooks (e.g. a Japanese language learning course and a French learning course), where specific digital ruled paper templates for such courses can be selected for surfacing to a user in lieu of (or in addition to) other general digital ruled templates that might not be as contextually relevant for the user. Processing operations relates to selection of one or more digital ruled paper templates are known to one skilled in the art, where ranking models (deterministic or predictive) confidence scoring, etc. may be applied based on an evaluation/analysis of a digital context associated with the user account. Further, population (processing operation 110) of a customized listing may further comprise executing processing operations to order digital ruled paper templates for presentation in the customized listing. For example, a customized digital ruled paper template may be prioritized in a populated listing if an evaluation of the digital context identifies that a user is accessing a specific electronic notebook (or frequently accesses a specific electronic notebook).

The customized listing of digital ruled paper templates may be transmitted (processing operation 112) to the client computing device, which can be utilized to surface the customized listing of digital ruled paper templates in a user interface of the notetaking service. Processing operation 112 may comprise transmission of data pertaining to specific digital ruled paper templates and a customized listing of the digital ruled paper templates from server-side computing devices to a client computing device. Communication between a server-side computing device and a client computing device may require a network connection (e.g. Internet) and processing operations related to such communications are known to one skilled in the art.

Once the service has returned the appropriate list of digital ruled paper templates, the client computing device then responds by surfacing (processing operation 114) this listing through the user interface of the notetaking service. Surfacing (processing operation 114) may occur based on the data transmitted (processing operation 112) to a client computing device from the notetaking service. For example, the notetaking service may be configured to surface (processing operation 114) the customized listing of digital rules paper templates inside a gallery of available templates that is presented through the UI of the notetaking service. Data associated with a customized listing of digital ruled paper templates may be accessible and/or shareable from a representation of the customized listing through the user interface of the notetaking service. On selection of a page template, the relevant style is transferred to page properties ensuring style preservation when collaborating across a tenant boundary (e.g. in a client-server communication example). In examples where a page style of a template is not currently cached through the notetaking service, the notetaking service may be configured to dynamically render (or reconstruct) the digital ruled paper template from these page properties as much of the style as the installed version supports.

Flow of method 100 may proceed to decision operation 116, where it is determined whether there is an update to the digital context associated with the user account. A digital context associated with a user account may change in real-time based on access to the notetaking service. The notetaking service may be configured to re-evaluate a digital context associated with a user account based on certain triggers such as a change to electronic notebook, specific user actions received through the notetaking service (e.g. re-selection of a UI menu for selecting digital ruled paper templates) or periodically after a predetermined time has passed where a user is accessing the notetaking service, among other examples. In examples where no update occurs, flow of decision operation 116 branches NO and processing of method 100 remains idle until a digital context of the user account is subsequently evaluated. In examples where an update to the digital context occurs, flow of decision operation 116 branches YES and processing of method 100 returns to processing operation 104, where a digital context associated with a user account is re-evaluated.

Figure 2:
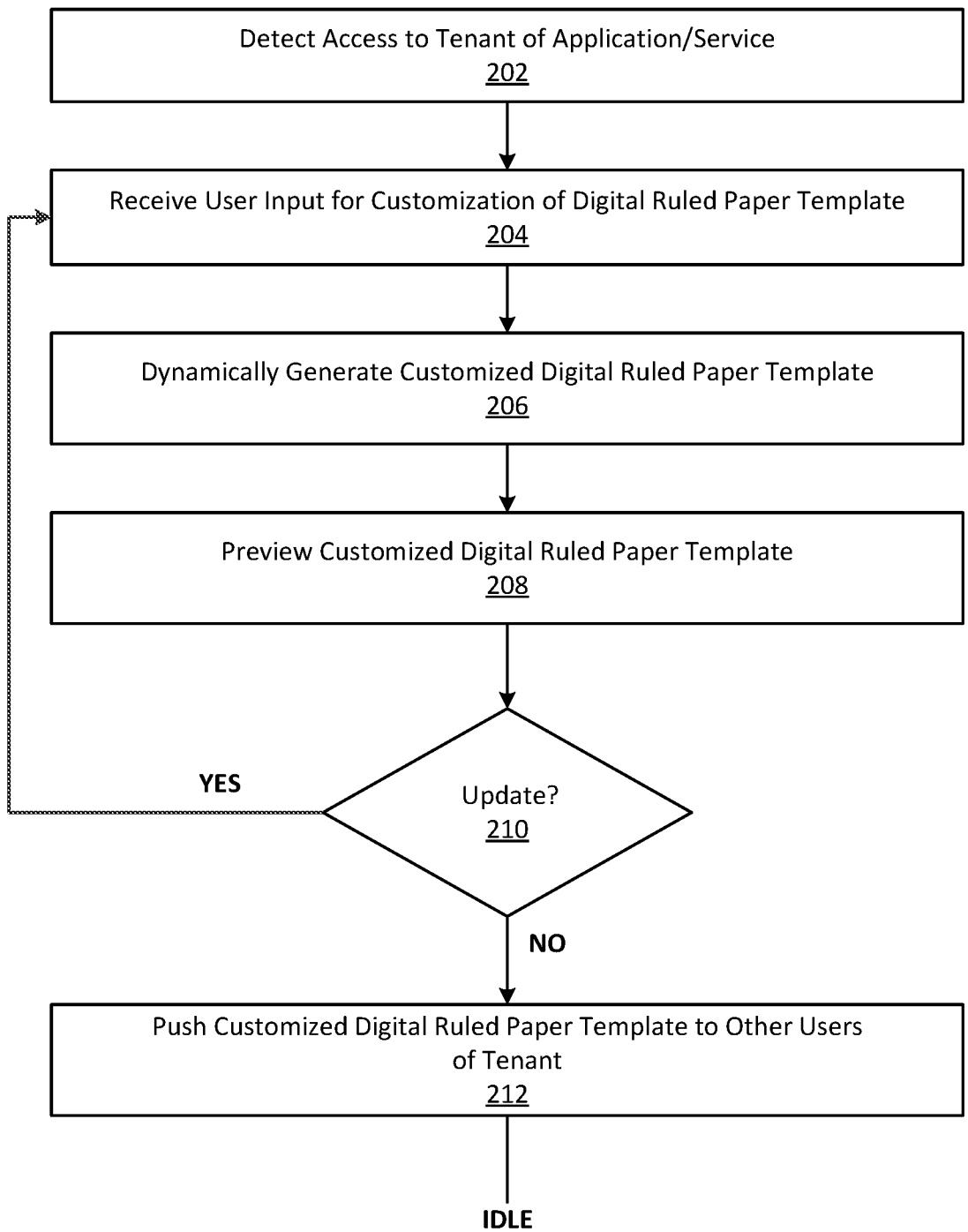
FIG. 2 illustrates an exemplary method related to dynamic generation of a customized digital ruled paper template with which aspects of the present disclosure may be practiced.

FIG. 2 illustrates an exemplary method 200 related to dynamic generation of a customized digital ruled paper template with which aspects of the present disclosure may be practiced. As an example, method 200 may be executed by an exemplary processing device and/or system such as those shown in FIGS. 3-5. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc.

Processing operations described in method 200 may be implemented by one or more components connected over a distributed network.

Method 200 begins at processing operation 202, where access to a specific tenant of an application/service is detected. A tenant may be specific domain within an application/service such as am electronic notebook of a notetaking service. Processing operations related to detection of access to a tenant of an application/service is described in the foregoing description of method 100 (e.g. processing operation 102). In one example, processing operation 202 may further comprise detecting specific actions of a user within an exemplary tenant. For instance, a user may select user interface (UI) features for creation of a customized digital ruled paper template for users associated with a tenant account.

Flow may proceed to processing operation 204, where user input is received for customization of a digital ruled paper template. A user (e.g. administrator of a tenant account) may choose to create a customized dynamic template for other users associated with the tenant account. An exemplary notetaking service may be configured to provide UI features to enable users to customize an exemplary digital ruled paper template. As described in the foregoing, page styles for digital ruled paper templates can be customized where developers may set specific metadata that defines a page style for the digital ruled paper template. A notetaking service may be configured to enable users to define lines, line groupings, set colors of lines/line groupings, etc. through the UI of the notetaking service. Examples of specific data that may be definable for a page style of a digital ruled paper template is further defined in the description of method 100 (e.g. processing operations 106 and 108). Additionally, the notetaking service may be configured to enable a user to set a name or identification for their customized template, for instance, where an identifier may be displayed when the digital ruled paper template is generated or further used to search for specific customized templates. Server-side computing devices may receive data relating to a customized digital ruled paper template and manage the customized digital ruled paper template for subsequent use related to the tenant account (e.g. surfacing the customized digital ruled paper template in a customized listing of digital ruled paper templates).

Flow of method 200 may proceed to processing operation 206, where a customized digital ruled paper template is dynamically generated based on the user input received in processing operation 204. Processing operations related to dynamic generation/rendering of a digital ruled paper template is described in the foregoing description of method 100 (e.g. processing operation 106). A customized digital rule paper template may be displayed (processing operation 208) for preview to the user, for example, to confirm the customized digital ruled paper template or make further updates to the template.

Flow may proceed to decision operation 210, where it is determined whether update is to occur to the digital ruled paper template. If an update is to occur to the digital ruled paper template, flow of decision operation 210 branches YES and processing of method 200 returns back to processing operation 204, where the user may provide update for customization of the digital ruled paper template. If no update occurs, flow of decision operation 210 branches NO and processing of method 200 proceeds to processing operation 212. At processing operation 212, the customized digital ruled paper template is pushed to other users associated with the tenant account. UI features for transmitting the customized digital ruled paper template to other users may enable a user account to tailor who the digital ruled paper template is sent to and how it is presented. In other instances, the customized digital ruled paper template is stored for access when generating customized listings of digital ruled paper templates on behalf of users. In one example, pushing (processing operation 212) of the customized digital ruled paper template comprises transmission of the customized digital ruled paper template to a service managed data store that is accessed when an exemplary listing of digital ruled paper templates is populated for surfacing to a client computing device. In another example, the customized digital ruled paper template or notification of creation and availability of the customized digital ruled paper template may be sent directly to users of a tenant account.

Additional examples described herein may extend to application/service usage related to selection of specific digital ruled paper templates. For instance, generation and management of exemplary digital ruled paper templates may be managed on a server side of a service, for example, to improve processing efficiency and user interaction with an exemplary notetaking service. In one instance, a user may be provided a customized digital ruled paper template that is new to the user. When the user accesses the customized digital ruled paper template, the notetaking service may be configured to enable the user to execute a smart copy/paste that enables copying and pasting of specific content from the template even when the user doesn't have the template saved locally on their computing device. Data associated with a smart copy/paste may be utilized across application/services of a platform. For example, a user may copy data from displayed digital ruled paper (generated from a digital ruled paper template) and use the data (and associated metadata) in another application/service such as a word processing service. Such usage may data may also be collected and evaluated to assist with digital context evaluations of a user account.

In further examples, page style data, that is associated with the digital ruled paper template, may be displayed in user interface as digital ruled paper. Digital ruled paper is a visual representation rendered from the digital ruled paper template. As referenced above, metadata such as glyphs, characters, symbols as well as other data such as formatting data for input etc. may specifically correspond to a customized digital ruled paper template. For example, a UI of the notetaking service may be adapted (e.g. certain features presented, glyphs prioritized etc.) based on metadata associated with a digital ruled paper template. As an example, a user may be accessing a Japanese language template, where Japanese characters or symbols are prioritized for presentation to the user. This may further provide a tailored user interaction for a user that is interacting with an exemplary notetaking service while also improving processing efficiency during execution of the notetaking service.

Figure 3:
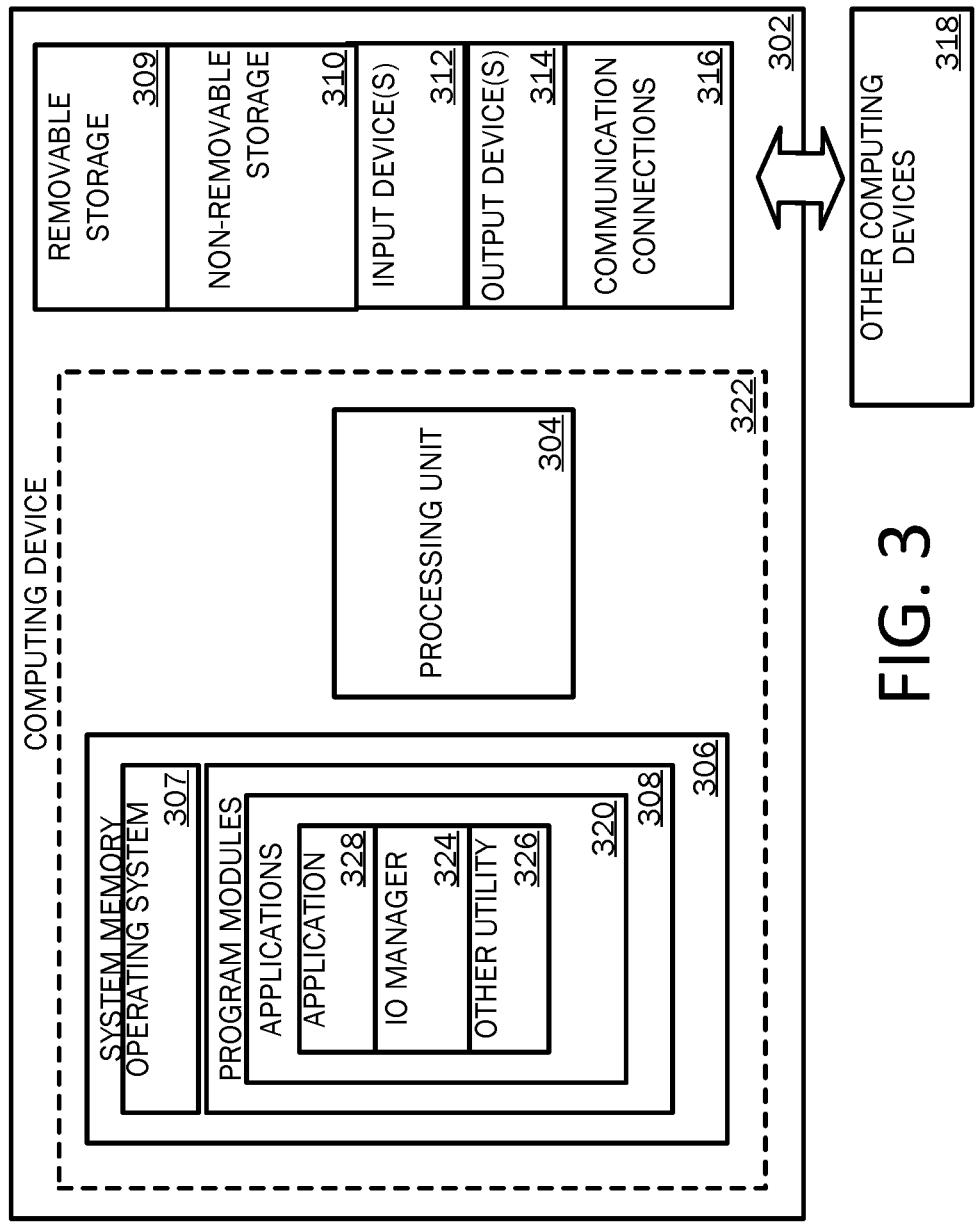
FIG. 3 is a block diagram illustrating an example of a computing device with which aspects of the present disclosure may be practiced.
Figure 4A:
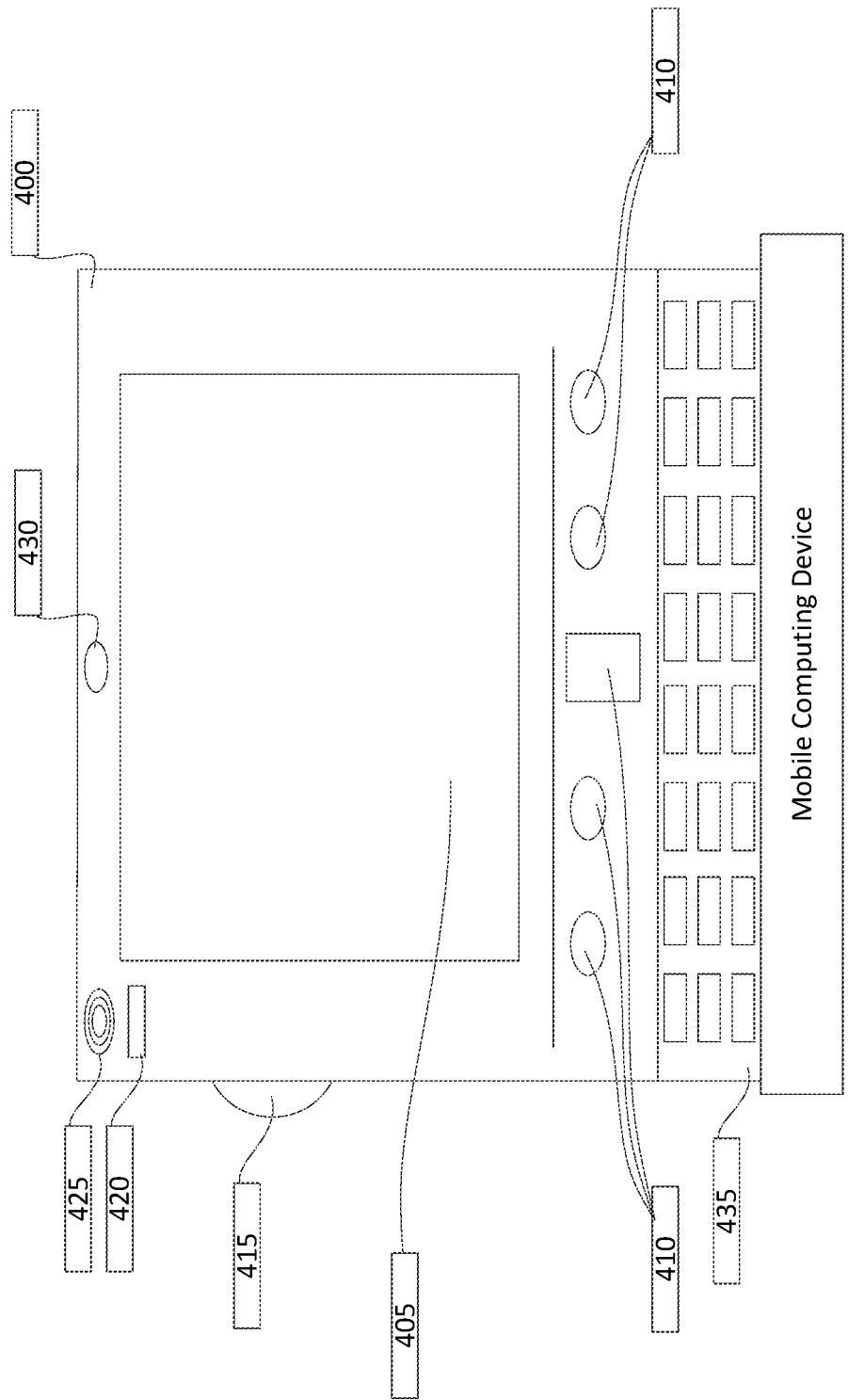
FIGS. 4A and 4B are simplified block diagrams of a mobile computing device with which aspects of the present disclosure may be practiced.
Figure 4B:
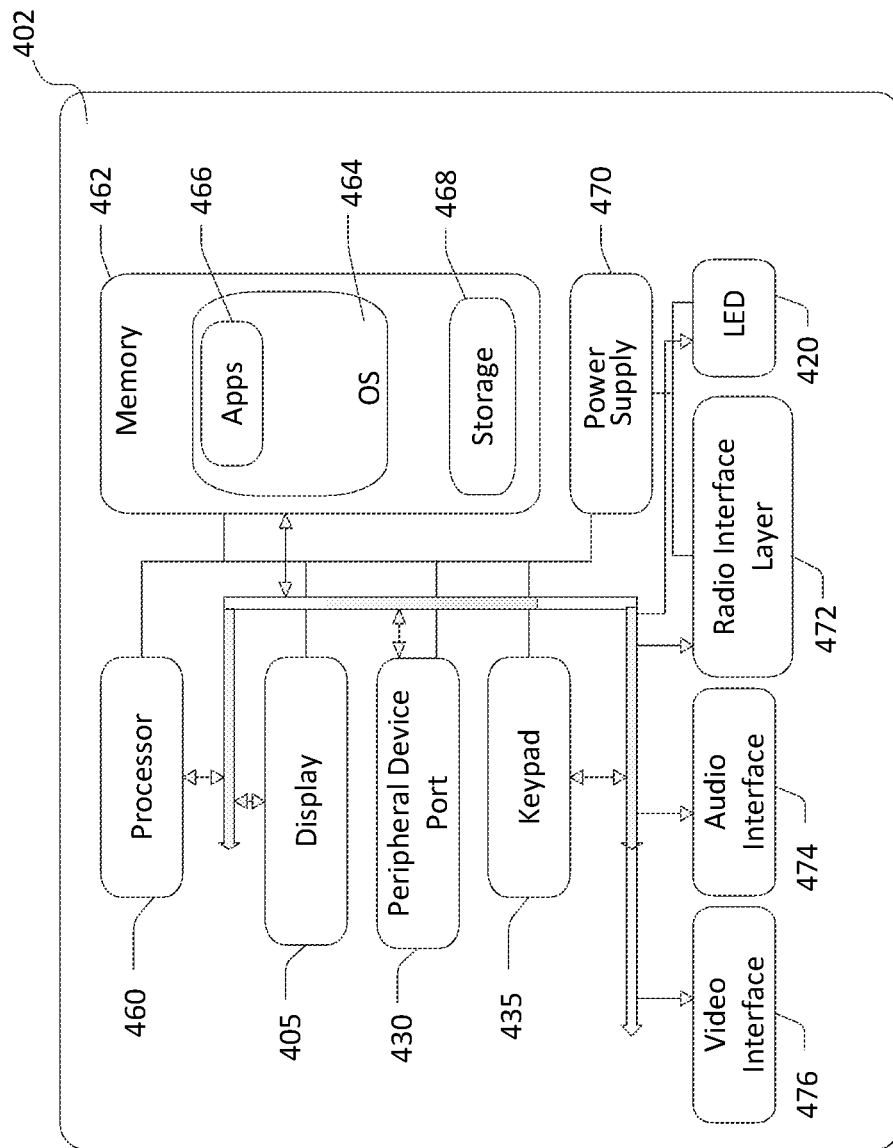
Figure 5:
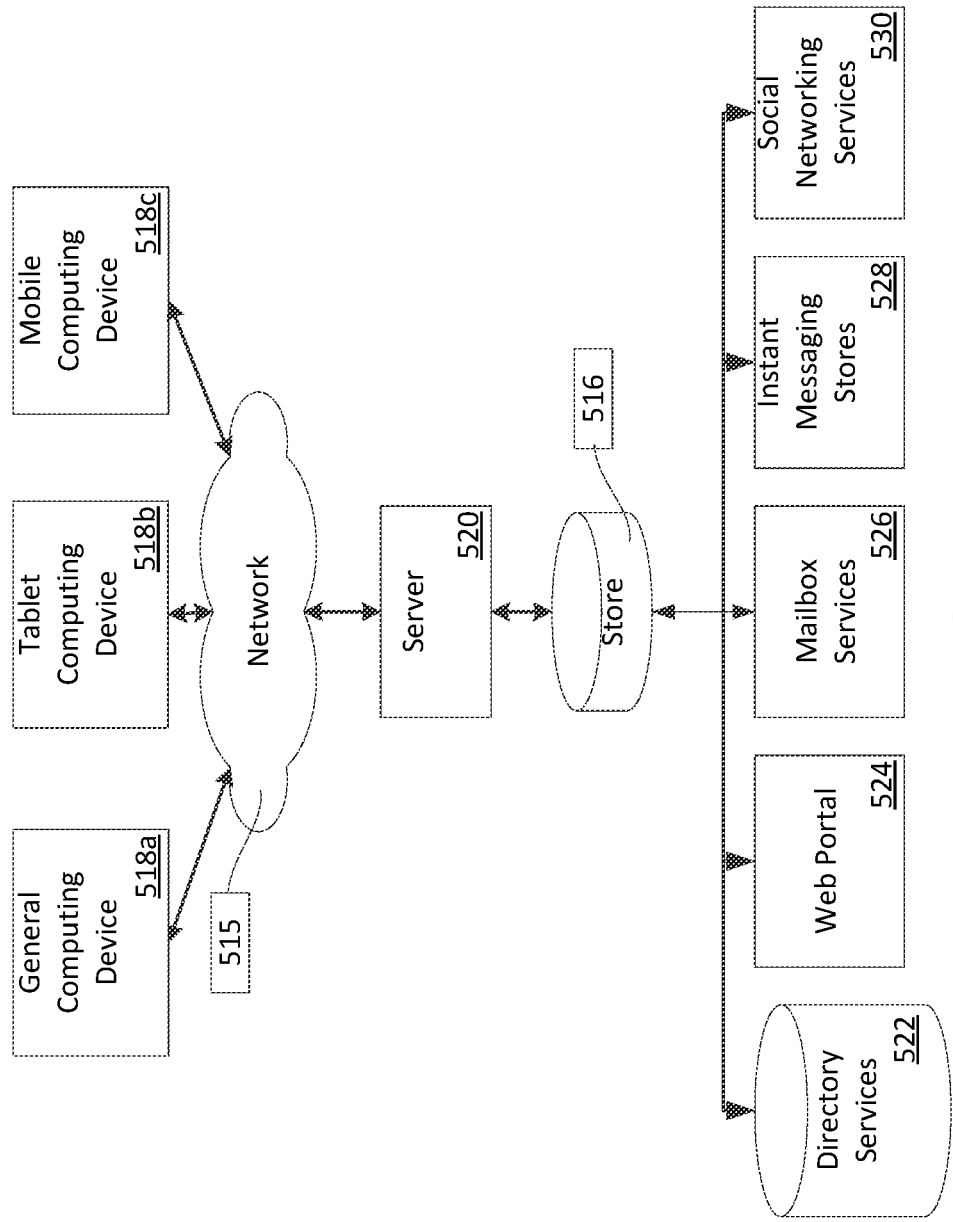
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein. FIG. 3 is a block diagram illustrating physical components of a computing device 302, for example a mobile processing device, with which examples of the present disclosure may be practiced. Among other examples, computing device 302 may be an exemplary computing device configured for dynamic generation and notification management of digital ruled paper templates as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for dynamic generation and notification management of digital ruled paper templates as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for dynamic generation and notification management of digital ruled paper templates as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   receiving, from a client device via a network connection, an indication of initial access to a notetaking service by an educational user account, wherein the notetaking service provides the educational user account with access to course-specific electronic notebooks displayable through a graphical user interface of the notetaking service;
   in response to the receiving of the indication of initial access to the notetaking service, generating, by a server device, a context evaluation result for dynamic creation of a digital ruled paper template based on a collective analysis of:
      user identity data of the educational user account, at the client device, during the indication of initial access to the notetaking service, and
      domain specific data identifying a course-specific electronic notebook that provides content for an educational course that the educational user account is registered in;
   dynamically creating, by the server device, the digital ruled paper template, providing digital ruled paper customized for the course-specific electronic notebook, by automatically defining page layout attributes for the digital ruled paper based on the analysis of the context evaluation result, wherein the page layout attributes comprise:
      a line grouping of the digital ruled paper,
      an angle for arrangement of lines in the line grouping, and
      a measurement unit defining replication of the lines in the line grouping; and
   transmitting, from the server device via the network connection, the digital ruled paper template to the client computing device for presentation.

2. The method of claim 1, wherein the dynamically creating of the digital ruled paper template further comprises defining, based on the analysis of the context evaluation result, a distance from a page origin of a first occurrence of the line grouping.

3. The method of claim 2, wherein the dynamically creating of the digital ruled paper template further comprises defining, based on the analysis of the context evaluation result, a color associated with the line grouping.

4. The method of claim 1, wherein the dynamically creating of the digital ruled paper template further comprises: defining one or more glyphs that correspond with the page layout attributes of the digital ruled paper, and providing, to the notetaking service, data indicating to prioritize the one or more glyphs in a user interface when the digital ruled paper template is presented.

5. The method of claim 1, further comprising: generating a customized listing of digital ruled paper templates for the educational user account that comprises a plurality of digital ruled paper templates, wherein the populating further comprises prioritizing the digital ruled paper template, dynamically created, in the customized listing among the plurality of digital ruled paper templates.

6. The method of claim 5, further comprising: rendering the customized listing of digital ruled paper templates for presentation through the graphical user interface of the notetaking service, and wherein the transmitting of the digital ruled paper template further comprises transmitting, data for the digital ruled paper template to the client computing device, in the customized listing of digital ruled paper templates.

7. The method of claim 1, wherein the server device executes a learning model to generate the context evaluation result.

8. The method of claim 1, wherein the domain specific data further comprises analysis of previous usage of digital ruled paper templates by the educational user account.

9. A system comprising:
   at least one processor of a server device; and
   a memory, operatively connected with the at least one processor, storing computer-executable instructions that, when executed by the at least one processor, causes the at least one processor to execute a method that comprises:

receiving, from a client device via a network connection, an indication of initial access to a notetaking service by an educational user account, wherein the notetaking service provides the educational user account with access to course-specific electronic notebooks displayable through a graphical user interface of the notetaking service;

in response to the receiving of the indication of initial access to the notetaking service, generating, by the server device, a context evaluation result for dynamic creation of a digital ruled paper template based on a collective analysis of:

user identity data of the educational user account, at the client device, during the indication of initial access to the notetaking service, and domain specific data identifying a course-specific electronic notebook that provides content for an educational course that the educational user account is registered in;

dynamically creating, by the server device, the digital ruled paper template, providing digital ruled paper customized for the course-specific electronic notebook, by automatically defining page layout attributes for the digital ruled paper based on the analysis of the context evaluation result, wherein the page layout attributes comprise:

a line grouping of the digital ruled paper, an angle for arrangement of lines in the line grouping, and a measurement unit defining replication of the lines in the line grouping; and transmitting, from the server device via the network connection, the digital ruled paper template to the client computing device for presentation.

10. The system of claim 9, wherein the dynamically creating of the digital ruled paper template further comprises defining, based on the analysis of the context evaluation result, a distance from a page origin of a first occurrence of the line grouping.

11. The system of claim 10, wherein the dynamically creating of the digital ruled paper template further comprises defining, based on the analysis of the context evaluation result, a color associated with the line grouping.

12. The system of claim 9, wherein the dynamically creating of the digital ruled paper template further comprises: defining one or more glyphs that correspond with the page layout attributes of the digital ruled paper, and providing, to the notetaking service, data indicating to prioritize the one or more glyphs in a user interface when the digital ruled paper template is presented.

13. The system of claim 9, wherein the method, executed by the at least one processor, further comprises: generating a customized listing of digital ruled paper templates for the educational user account that comprises a plurality of digital ruled paper templates, wherein the populating further comprises prioritizing the digital ruled paper template, dynamically created, in the customized listing among the plurality of digital ruled paper templates.

14. The system of claim 13, wherein the method, executed by the at least one processor, further comprises: rendering the customized listing of digital ruled paper templates for presentation through the graphical user interface of the notetaking service, and wherein the transmitting of the digital ruled paper template further comprises transmitting, data for the digital ruled paper template to the client computing device, in the customized listing of digital ruled paper templates.

15. The system of claim 9, wherein the server device executes a learning model to generate the context evaluation result.

16. The system of claim 9, wherein the domain specific data further comprises analysis of previous usage of digital ruled paper templates by the educational user account.

17. A computer storage media storing computer-executable instructions that, when executed by at least one processor of a server device, causes the at least one processor to execute a method comprising:

receiving, from a client device via a network connection, an indication of initial access to a notetaking service by an educational user account, wherein the notetaking service provides the educational user account with access to course-specific electronic notebooks displayable through a graphical user interface of the notetaking service;

in response to the receiving of the indication of initial access to the notetaking service, generating, by the server device, a context evaluation result for dynamic creation of a digital ruled paper template based on a collective analysis of:

user identity data of the educational user account, at the client device, during the indication of initial access to the notetaking service, and domain specific data identifying a course-specific electronic notebook that provides content for an educational course that the educational user account is registered in;

dynamically creating, by the server device, the digital ruled paper template, providing digital ruled paper customized for the course-specific electronic notebook, by automatically defining page layout attributes for the digital ruled paper based on the analysis of the context evaluation result, wherein the page layout attributes comprise:

a line grouping of the digital ruled paper, an angle for arrangement of lines in the line grouping, and a measurement unit defining replication of the lines in the line grouping; and transmitting, from the server device via the network connection, the digital ruled paper template to the client computing device for presentation.

18. The computer storage media of claim 17, wherein the dynamically creating of the digital ruled paper template further comprises defining, based on the analysis of the context evaluation result, a distance from a page origin of a first occurrence of the line grouping.

19. The computer storage media of claim 18, wherein the dynamically creating of the digital ruled paper template further comprises defining, based on the analysis of the context evaluation result, a color associated with the line grouping.

20. The computer storage media of claim 17, wherein the dynamically creating of the digital ruled paper template further comprises: defining one or more glyphs that correspond with the page layout attributes of the digital ruled paper, and providing, to the notetaking service, data indicating to prioritize the one or more glyphs in a user interface when the digital ruled paper template is presented.

* * * * *